(12) United States Patent
Leymann et al.

(10) Patent No.: US 6,237,020 B1
(45) Date of Patent: May 22, 2001

(54) TASK-ORIENTED AUTOMATIC DISTRIBUTION OF SOFTWARE

(75) Inventors: Frank Leymann, Aidlingen; Dieter Roller, Schönaich, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/940,181

(22) Filed: Sep. 30, 1997

(30) Foreign Application Priority Data

Oct. 1, 1996 (DE) .............................................. 961 15 713

(51) Int. Cl.[7] ...................................................... G06F 15/16

(52) U.S. Cl. .......................................... 709/201; 709/203

(58) Field of Search .................................. 707/203, 1, 10; 395/200.38, 200.31, 200.33, 600, 155; 364/300; 709/221, 223, 219, 216, 203, 201; 380/4, 25; 705/8, 7; 713/201

(56) References Cited

U.S. PATENT DOCUMENTS

| | | | |
|---|---|---|---|
| 4,558,413 | * 12/1985 | Schmidt et al. | 364/300 |
| 5,117,458 | * 5/1992 | Takaragi et al. | 380/4 |
| 5,319,705 | * 6/1994 | Halter et al. | 380/4 |

(List continued on next page.)

OTHER PUBLICATIONS

Hollingswork, Workflow management Coalition The Workflow Reference Model, Jan. 1995.*
Stein, Workflow Proposal 1, http://waldo.wi.mit.edu/informatics/workflow/lincohn_workfolw.html, Sep. 1996.*
Marshak, Ronni T., IBM's FlowMark: Object–Oriented Workflow for Mission–Critical Applications; *Workgroup Computing Report*, vol. 17, No. 5, pp. 3–13.
Leymann, et al., Business Process Management with Flow-Mark, *IEEE*, pp. 230–234 (1994).
Spohn, D. J., Project Management Environment, *IBM Technical Disclosure Bulletin*, vol. 32, No. 9A, pp. 250–254 (Feb. 1990).
Inniss, H. A., et al., Workflow Management Based on an Object–Oriented Paradigm, *IBM Technical Disclosure Bulletin*, vol. 37, No. 03, p. 185 (Mar. 1994).
Leymann, et al., Managing business processes as an information resource, *IBM Systems Journal*, vol. 33, No. 2, pp. 326–348.
Introducing Flow Mark for OS/2: Model efficiency into your business, IBM Document GH19–8215–01, IBM Corporation (Mar. 1994).
Leymann, Frank, A Meta Model to Support Modelling and Execution of Processes, *Proceedings of the 11th European Meeting on Cybernetics and System Research EMCR92*, pp. 287–294 (Austria, 4/21–24/92).
Roller, Dieter, Verifikation von Workflows in IBM Flow-Mark, *Geschaeftsprozessmodellierung und Workflows*, Ch. 20, pp. 354–368 (International Thompson Publishing, 1995).

*Primary Examiner*—Robert B. Harrell
*Assistant Examiner*—Thong Vu
(74) *Attorney, Agent, or Firm*—Myers Bigel Sibley & Sajovec, P.A.; A. Bruce. Clay (57) ABSTRACT

Methods, systems and computer program products are provided for automatically distributing software to a target computer system by obtaining a computer-system-description of the target-computer-system and at least one process-model of a workflow-management-system (WFMS) which includes an activity to be carried out by the target computer system. The software requirements of the target computer system are determined based upon the process model of the WFMS and the computer-system-description of the target computer system. The determined software requirements are then provided to a software distribution management system (SDMS) to distribute the determined software to the target computer system.

30 Claims, 7 Drawing Sheets

U.S. PATENT DOCUMENTS

| | | | | |
|---|---|---|---|---|
| 5,495,610 | * | 2/1996 | Shing et al. | 395/600 |
| 5,535,322 | * | 7/1996 | Hecht | 395/155 |
| 5,758,071 | * | 5/1998 | Burgess et al. | 395/200.38 |
| 5,765,205 | * | 6/1998 | Breslau et al. | 711/203 |
| 5,799,297 | * | 8/1998 | Goodridge et al. | 707/1 |
| 5,826,239 | * | 10/1998 | Du et al. | 705/8 |
| 5,832,222 | * | 11/1998 | Dziadosz et al. | 709/216 |
| 5,835,911 | * | 11/1998 | Nakagawa et al. | 707/203 |
| 5,838,918 | * | 11/1998 | Prager et al. | 709/221 |
| 5,845,090 | * | 12/1998 | Collins, III et al. | 709/221 |
| 5,848,393 | * | 12/1998 | Goodridge et al. | 705/8 |
| 5,859,977 | * | 1/1999 | Nishiyama et al. | 709/223 |
| 5,890,133 | * | 3/1999 | Ernst | 705/7 |
| 5,894,516 | * | 4/1999 | Brandenburg | 380/4 |
| 5,933,497 | * | 8/1999 | Beetcher et al. | 380/4 |
| 5,940,829 | * | 8/1999 | Tsuiki et al. | 707/10 |
| 5,943,423 | * | 8/1999 | Muftic | 380/25 |
| 5,960,420 | * | 9/1999 | Leymann et al. | 707/1 |
| 5,999,911 | * | 12/1999 | Berg et al. | 705/9 |
| 6,006,018 | * | 12/1999 | Brunett et al. | 709/219 |
| 6,035,403 | * | 3/2000 | Subbiah et al. | 713/201 |

* cited by examiner

```
PROGRAM ACTIVITY 'CreditLimitCheck'
    PROGRAM 'CheckCreditLimit'
    DONE_BY MEMBER OF ROLE  'CorporateCreditExpert'
    DONE_BY ORGANIZATION     'CreditCheck'
    DONE_BY LEVEL  7
END 'CreditLimitCheck'
```

FIG. 6

```
ORGANIZATION 'CreditCheck'
     MANAGER   'Thomas'
END 'CreditCheck'

PERSON  'Smith'
     LAST_NAME    'Smith'
     FIRST_NAME   'John'
     LEVEL   7
     RELATED_ROLE            'CorporateCreditExpert'
     RELATED_ORGANIZATION    'CreditCheck'
END  'Smith'

PERSON  'Taylor'
     LAST_NAME    'Taylor'
     FIRST_NAME   'Jack'
     LEVEL   7
     RELATED_ROLE            'CreditExpert'
     RELATED_ORGANIZATION    'CreditCheck'
END  'Taylor'

PERSON  'Thomas'
     LAST_NAME    'Thomas'
     FIRST_NAME   'Sally'
     LEVEL   8
     RELATED_ROLE            'Manager'
     RELATED_ORGANIZATION    'CreditCheck'
END  'Thomas'

ROLE  'CreditExpert'
ROLE  'CorporateCreditExpert'
ROLE  'Manager'
```

FIG. 7

```
WORKSTATION 'PC4711'
        TYPE            486
        MEMORY          32
        USER            'Smith'
        OPSYS           'OS/2'
        SERVER          'PC4712'
        CONNECTION      'TCP/IP'
END 'PC4711'

WORKSTATION 'PC4713'
        TYPE            Power
        MEMORY          64
        USER            'Smith'
        OPSYS           'AIX'
        SERVER          'PC4712'
        CONNECTION      'TCP/IP'
END 'PC4713'
```

FIG. 8

```
PROGRAM 'CheckCreditLimit'
        OPSYS               'OS/2'
                DEFAULT         '123.EXE'
                NAME            '234.EXC'
                    USER            'Smith'
                    USER            'Taylor'
        OPSYS               'AIX'
                DEFAULT         'ABC.EXE'
                NAME            'BCD.EXE'
                    USER            'Smith'
END 'CheckCreditLimit'
```

TASK-ORIENTED AUTOMATIC DISTRIBUTION OF SOFTWARE

FIELD OF THE INVENTION

The present invention relates to the field of computer systems acting as workflow management systems (WFMS).

BACKGROUND OF THE INVENTION

A new area of technology with increasing importance is the domain of Workflow-Management-Systems (WFMS). WFMS supports the modeling and execution of business processes. Business processes control which piece of work of an interrelated collection of pieces of work will be performed by whom and which resources are exploited for this work, i.e. a business process describes how an enterprise will achieve its business goals. The individual pieces of work might be distributed across a multitude of different computer systems connected by some type of network.

The process of designing, developing and manufacturing a new product and the process of changing or adapting an existing product presents many challenges to product managers and engineers. These challenges may include bringing the product to market for the least cost and within schedule while maintaining or even increasing product quality. Many companies are realizing that the conventional product design process is not satisfactory to meet these needs. To meet these demands may require early involvement of manufacturing engineering, cost engineering, logistic planning, procurement, manufacturing, service and support with the design effort. Furthermore, these demands may require planning and control of product data through design, release, and manufacturing.

The correct and efficient execution of business processes within a company, e. g. development or production processes, is of enormous importance to a company and has significant influence on a company's overall success in the market place. Therefore, these processes should be regarded in a manner similar to technology processes and should be tested, optimized and monitored. The management of such processes is usually performed and supported by a computer based process or workflow management system. Some of these computer based workflow management systems include:

D. J. Spoon: "Project Management Environment", IBM Technical Disclosure Bulletin, Vol. 32, No. 9A, February 1990, pages 250 to 254, describes a process management environment including an operating environment, data elements, and application functions and processes.

R. T. Marshak: "IBM's FlowMark, Object-Oriented Workflow for Mission-Critical Applications", Workgroup Computing Report (USA), Vol. 17, No. 5, 1994, page 3 to 13, describes the object character of IBM FlowMark as a client/server product built on a true object model that is targeted for mission-critical production process application development and deployment.

H. A. Inniss and J. H. Sheridan: "Workflow Management Based on an Object-Oriented Paradigm", IBM Technical Disclosure Bulletin, Vol. 37, No. 3, March 1994, page 185, describes other aspects of object-oriented modeling on customization and changes.

F. Leymann and D. Roller: "Business Process Management with FlowMark", Digest of papers, Cat. No. 94CH3414-0, Spring COMPCON 94, 1994, pages 230 to 234, describes the state-of-the-art computer process management tool IBM FlowMark. The meta model of IBM FlowMark is presented as well as the implementation of IBM FlowMark. The possibilities of IBM FlowMark for modelling of business processes as well as their execution are discussed. The product IBM FlowMark is available for different computer platforms and documentation for IBM FlowMark is available in every IBM branch.

F. Leymann: "A meta model to support the modelling and execution of processes", Proceedings of the 11th European Meeting on Cybernetics and System Research EMCR92, Vienna, Austria, Apr. 21 to 24, 1992, World Scientific 1992, pages 287 to 294, presents and discussed in detail a meta model for controlling business processes.

The "IBM FlowMark for OS/2", document number GH 19-8215-01, IBM Corporation, 1994, available in every IBM sales office, represents a typical modern, sophisticated, and powerful workflow management system. It supports the modelling of business processes as a network of activities. This network of activities, the process model, is constructed as a directed, acyclic, weighted, colored graph. The nodes of the graph represent the activities or work items which are performed. The edges of the graph, the control connectors, describe the potential sequence of execution of the activities. Definition of the process graph is via the IBM FlowMark Definition Language (FDL) or the built-in graphical editor. The runtime component of the workflow manager interprets the process graph and distributes the execution of activities to the right person at the right place, e. g. by assigning tasks to a work list according to the respective person, wherein said work list is stored as digital data within said workflow or process management computer system.

F. Leymann and W. Altenhuber: "Managing business processes as an information resource", IBM Systems Journal, Vol. 32(2), 1994, describes the mathematical theory underlying the IBM FlowMark product.

D. Roller: "Verifikation von Workflows in IBM FlowMark", in J. Becker und G. Vossen (Hrsg.): "Geschaeftsprozessmodellierung und Workflows", International Thompson Publishing, 1995, describe the requirement and possibility of the verification of workflows. Furthermore the feature of graphical animation for verification of the process logic is presented as it is implemented within the IBM FlowMark product.

For implementing a computer based process management system, first the business processes should be analyzed and, as the result of this analysis, a process model constructed as a network of activities corresponding to the business process. In the IBM FlowMark product, the process models are not transformed into an executable. At run time, an instance of the process is created from the process model, called a process instance. This process instance is then interpreted dynamically by the IBM FlowMark product.

A completely different area of technology is the area of Software Distribution Management Systems (SDMS). These systems support and ease the distribution and installation of software products on computer systems within distributed networks of heterogeneous computers. SDMS allows requests of a certain software package for a target computer system and the SDMS then delivers and installs the requested software on the target computer system. Depending on the particular SDMS one is referring to, the SDMS may also check pre- and co-requisites of the requested software, so that the requested software is operational. For instance if a certain software package is available for different processor types the correct software version adapted to the target computer system is selected. Also from multiple versions of a certain software package the one which fits into the software environment on the target computer system will be selected by the SDMS. Moreover many more dependencies with respect to the underlying hardware and software installed on the target computer system may be checked by a SDMS.

Such an SDMS is known for example from the teaching of N. Shing, et al., Software distribution system to build and distribute a software release, U.S. Pat. No. 5,495,610 issued Feb. 27, 1996 and assigned to Seer Technologies, Inc., New York. This document describes a method for creating and electronically distributing a new release of a software program in a computer system having a number of processors. One of the software programs is modified. An impact analysis is performed to identify modules to be modified as a result of the modification. The new release is stored in a central storage device. It is determined which processors require a copy of the new release, and the new release is electronically down-loaded from the central storage device to each processor.

Another SDMS is known for example from the N. R. Prager et al., Distributed Network Configuration Management Using a Subscription Method, U.S. Pat. application filed Dec. 13, 1993. This article relates to a method to support the configuration management task in large, complex, distributed networks of heterogeneous computers. A management-by-subscription paradigm is introduced that allows individual systems to express interests in receiving information like configuration information from a central configuration database storing that particular information. By subscribing to that central database the target system will be served with future distributions and updates to the subscribed information or software.

A serious drawback of many of these SDMS is the necessity to either explicitly configure these SDMS, i.e. to endow a SDMS, or a database maintained by that SDMS, with the knowledge of hardware characteristics and installed software of the target computer systems to be supported. Other SDMS leave it to the requester to perform the compatibility and consistency checks with respect to the requested software and on the available target computer systems environment.

SUMMARY OF THE INVENTION

In view of the above discussion, it is an object of the present to improve applicability of SMDS for automated software installation.

These and other objects of the present invention are provided by methods, systems and computer program products which includes a WFMS which may execute a multitude of process models consisting of a network of potentially distributed activities. For each activity information is defined within the WFMS as to which available programs implement that activity, on which hardware environments and under control of which operating systems the particular programs can be executed. The WFMS stores these process models in one or more databases. Moreover descriptive information on target computer systems may be stored either within the WFMS or within separate asset data bases. Such descriptive information may identify the type of operating system controlling a target computer system. The present invention automatically distributes software to a target computer system analyzing the above mentioned information to determine the software requirements of at least one target computer system for executing an activity of a process model.

The present invention automatically distributes software to a target computer system by obtaining a computer-system-description of the target-computer-system and at least one process-model of a workflow-management-system (WFMS) which includes an activity to be carried out by the target computer system. The software requirements of the target computer system are determined based upon the process model of the WFMS and the computer-system-description of the target computer system. The determined software requirements are then provided to a software distribution management system (SDMS) to distribute the determined software to the target computer system.

Furthermore, the process model may be created by defining at least one process-model within a workflow management system (WFMS), wherein the process model includes at least one activity connected as an arbitrary graph.

In a particular embodiment of the present invention, the activity is associated with at least one program-description of a program implementing the activity which includes at least one program-identification. In such a case, the software requirements are determined by analyzing the computer-system-description of the target computer system and the program-description of the at least one activity of the process-model of the WFMS to determine a program-identification of a program which is executable on the target computer system. The determined program-identification may then be used to request the determined program from the SDMS.

The determined software may also be provided to the target computer system through the SDMS. Also, it may be determined from the determined software requirements associated with the at least one activity whether the target computer system has any prerequisite software requirements. The prerequisite software may also then be provided to the target computer system through the SDMS.

In another embodiment of the present invention, the process model includes a plurality of activities and the determination of software requirements and providing of those requirements is carried out for each of the activities of the process model.

In still another embodiment of the present invention, the activities are associated with a plurality of target computer systems. In such an embodiment, a computer-system-description of the target computer system is obtained for each of the target computer systems. The software requirements of the target computer system are also determined for each of the plurality of target computer systems based upon the process model of the WFMS and the computer-system-description of the target computer system. Finally, the determined software requirements are provided to the software distribution management system (SDMS) for each of the plurality of target computer systems. In another embodiment of the present invention each of the plurality of computer-system-descriptions includes a user identification of a user of the corresponding target computer system and the activity is associated with a user description identifying a user identification of at least one authorized user to execute the activity. In such a case, at least one target computer system is identified from the plurality of target computer systems based on the activity such that the identified target system corresponds to a user identification of a user authorized to execute the activity. The software requirements are then determined and provided to the SDMS for the identified target computer system.

In a particular embodiment of the present invention, the determination of the software requirements includes adding the determined software requirements to a list of software requirements. Then, the list of software requirements are provided to the SDMS to request the software.

Additionally, the computer-system-description of the target computer system may be analyzed to determine if the WFMS is to be executed on the target computer system. If the WFMS is to executed on the target system, the WFMS may be included in the determined software requirements which are provided to the SDMS.

As will further be appreciated by those of skill in the art, the present invention may be embodied as a method, apparatus/system or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention will now be described with respect to flowchart illustrations of one embodiment of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Throughout the description below the acronym "DB" refers to database, "IT" refers to information technology, "SDMS" refers to software distribution management systems and "WFMS" refers to workflow management system.

The current invention is illustrated with reference to International Business Machine Corporation's FlowMark workflow management system. However, other WFMS's could be used instead. Furthermore, the current teaching may also be applied to other types of systems which incorporate WFMS functionalities.

References to databases in the present description are exemplary and not intended to limit the present invention. Thus, the teaching of the current invention can also be applied to situations where the information the invention is dealing with is stored, not in a multitude of databases, but in a single common database. Moreover, flat files can be used instead of databases without deviating from the teachings of the present invention.

The present invention discusses distributing "programs" to target computer systems. Of course in many cases the term program actually refers to a specific software entity executable by a certain computer system. However, this is only one specific case. Typically, a program is handled as a file or data set in a computer system. Therefore, when as used herein references to distributing programs refers to distributing some type of file or files. Even more generally, distribution of programs also might include distribution of files with a contents not executable by a computer system. For instance, programs do require additional information stored in certain files as simple data for their processing. Therefore, as used herein, reference to "programs" to be distribute also refers to such files.

Introduction

From an enterprise point of view the management of business processes is becoming increasingly important. A WFMS may support both, the modeling of business processes and their execution.

Modeling of a business process as a syntactical unit in a way that is directly supported by a software system is extremely desirable. Moreover, the software system can also work as an interpreter with such a model as input. The model, called a process model or workflow model, can then be instantiated and the individual sequence of work steps depending on the context of the instantiation of the model can be determined. Such a model of a business process can be perceived as a template for a class of similar processes performed within an enterprise. The model is a schema describing all possible execution variants of a particular kind of business process. An instance of such a model and its interpretation represents an individual process, i.e. a concrete, context dependent execution of a variant prescribed by the model.

A WFMSs facilitates the management of business processes. It provides a means to describe models of business processes (build time) and it drives business processes based on an associated model (run time). The meta model of IBM's WFMS FlowMark, i.e. the syntactical elements provided for describing business process models, and the meaning and interpretation of these syntactical elements, is described next.

A process model is a complete representation of a process, comprising a process diagram and the settings that define the logic behind the components of the diagram. Using various services provided by FlowMark these buildtime definitions of the process model are then converted into process templates for use by FlowMark at runtime. Components of a FlowMark process model may include processes, activities, blocks, control flows, connectors, data containers, data structures, conditions, programs, and staff.

In light of this background, a process, modeled by a process model within FlowMark, is a sequence of activities that must be completed to accomplish a task. The process is the top-level element of a FlowMark workflow model. In a FlowMark process, it can be defined:

how work is to progress from one activity to the next;
which persons are to perform activities and what programs they are to use; and
whether any other processes, called subprocesses, are nested in the process.

Furthermore, multiple instances of a FlowMark process can run in parallel.

Activities are the fundamental elements of the meta model. An activity represents a business action that is from a certain perspective a semantical entity of its own. With the model of the business process it might have a fine-structure that is then represented in turn via a model, or the details of it are not of interest at all from a business process modeling point of view. Refinement of activities via process models allows for both, modeling business processes bottom-up and top-down. Activities, being a step within a process, represent a piece of work that the assigned person can complete by starting a program or another process. In a process model, the following information is associated with each activity:

what conditions must be met before the activity can start;
whether the activity must be started manually by a user or can start automatically;
what condition indicates that the activity is complete;
whether control can exit from the activity automatically or the activity must first be confirmed as complete by a user;
how much time is allowed for completion of the activity;
who is responsible for completing the activity;
which program or process is used to complete the activity; and
what data is required as input to the activity and as output from it.

A FlowMark process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The FlowMark workflow manager navigates a path through the process that is determined by the evaluation to true of start conditions, exit conditions, and transition conditions.

The results that are, in general, produced by the work represented by an activity are put into an output container, which is associated with each activity. Since an activity will in general access output containers of other activities. Each activity is also associated with an input container. At run time, the actual values for the formal parameters building the input container of an activity represent the actual context of an instance of the activity. Each data container is defined by a data structure. A data structure is an ordered list of variables, called members, that have a name and a data type. Data connectors represent the transfer of data from output containers to input containers. When a data connector joins an output container with an input container, and the data structures of the two containers match exactly, the FlowMark workflow manager maps the data automatically.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Thus, control connectors model the potential flow of control within a business process model. Default connectors specify where control should flow when no control connector leaving an activity evaluates to true. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Conditions are the means by which it is possible to specify the flow of control in a process. In FlowMark process models logical expressions can be defined that are evaluated by FlowMark at runtime to determine when an activity may start, end, and pass control to the next activity. Start conditions are conditions that determine when an activity with incoming control connectors can start. The start condition may specify that all incoming control connectors must evaluate to true, or it may specify that at least one of them must evaluate to true. Whatever the start condition, all incoming connectors must be evaluated before the activity can start. If an activity has no incoming control connectors, it becomes ready when the process or block containing it starts.

In addition, a Boolean expression called a transition condition is associated with each control connector. Parameters from output containers of activities having already produced their results are followed as parameters referenced in transition conditions. When at run time an activity terminates successfully all control connectors leaving this activity are determined and the truth value of the associated transition conditions is computed based on the actual values of their parameters. Only the end points of control connectors, the transition conditions of which evaluated to TRUE, are considered as activities that might be executed based on the actual context of the business process. Thus, transition conditions model the context dependent actual flow of control within a business process (i.e. an instance of a model).

Business processes encompass long running activities in general. Such an activity need to be allowed to become interrupted. Thus, termination of an activity does not necessarily indicate that the associated task has been finished successfully. In order to allow the measurement of successfullness of the work performed by an activity a Boolean expression called an exit condition is associated with each activity. Activities whose exit condition evaluated to true in the actual context are treated as successfully terminated. For determination of the actual control flow precisely the successfully terminated activities are considered. Thus, the logical expression of an exit condition, if specified, must evaluate to true for control to pass from an activity or block.

In addition to describing the potential flow of control and data between activities a business process model also encompasses the description of the flow of the activities itself between "resources" actually performing the pieces of work represented by each activity. A resource may be specified as a particular program, person, a role, or an organizational unit. At run time tasks are resolved into requests to particular persons to perform particular activities resulting in workitems for that person. Staff assignments are the means to distribute activities to the right people in the sequence prescribed by the control flow aspect of a business process model. Each activity in a process is assigned to one or more staff members defined in the FlowMark database. Whether an activity is started manually by the user or automatically by the FlowMark workflow manager, and whether it requires user interaction to complete or completes automatically, a staff member must be assigned to it. FlowMark staff definition entails more than identifying people at your enterprise to the FlowMark database. For each person defined, you can specify a level, an organization, and multiple roles. These attributes can be used at run time to dynamically assign activities to people with suitable attributes.

In the FlowMark workflow manager, program means a computer-based application program that supports the work to be done in an activity. Program activities reference executable programs using the logical names associated with the programs in FlowMark program registrations. The program registration can contain run-time parameters for the executable program.

FlowMark consists, at the coarsest level, of a build time component and a run time component. The build time component supports the modeling of business processes according to the meta model described above and the run time component supports the corresponding semantics. Both components are implemented in a client/server structure. The client delivers the interaction with the user via an object-oriented graphical interface, invokes local tools, and provides animation. The server maintains the database for process instances, navigates through the process graph, and assigns the activities to the proper resources.

Process definition includes modeling of activities, control connectors between the activities, input/output container, and data connectors. A process is represented as a directed acyclic graph with the activities as nodes and the control/data connectors as the edges of the graph. The graph is manipulated via a built-in, event-driven, CUA compliant graphic editor. The data containers are specified as named data structures. These data structures themselves are specified via the DataStructureDefinition facility.

FlowMark distinguishes three main types of activities: program activities, process activities, and blocks. Program activities are implemented through programs. The programs are registered via the Program Definition facility. Blocks contain the same constructs as processes, such as activities, control connectors etc. They are, however, not named and have their own exit condition. If the exit condition is not met, the block is started again. The block thus implements a Do Until construct. Process activities are implemented as processes. These subprocesses are defined separately as regular, named processes with all its usual properties.

Process activities offer great flexibility for process definition. Process activities not only allows for the construction of a process through permanent refinement of activities into program and process activities (top-down), but also for the building of a process out of a set of existing processes (bottom-up). In particular, process activities help to organize the modeling work if several process modelers are working together.

Process activities allow the team members to work independently on different activities. Program and process activities can be associated with a time limit. The time limit specifies how long the activity may take. If the time is exceeded, a designated person is notified. If this person does not react within another time limit, the process administrator is notified. This time limit and reporting not only helps to recognize critical situations but also helps to detect process deficiencies as all notifications are recorded in an audit trail.

All data structures used as templates for the containers of activities and processes are defined via the Data Structure Definition Facility. Data Structures are names and are defined in terms of elementary data types, such as float, integer, or string and references to existing data structures. Managing data structures as separate entities has the advantage that all interfaces of activities and their implementations are managed consistently in one place (similar to header files in programming languages).

All programs which implement program activities are defined via the Program Registration Facility. Registered for each program is the name of the program, its location, and the invocation string. The invocation string consists of the program name and the command string passed to the program.

Before process instances can be created, the process model must be translated to ensure the correctness and completeness of the process model. The translated version of the model is used as a template when a process instance is created. This allows for changes to be made to the process model without affecting executing process instances.

A process instance is started either via the graphical interface or via the callable process application programming interface. When a process is started, the start activities are located, the proper people are determined, and the activities are posted onto the work list of the selected people. If a user selects the activity, the activity is executed and removed from the work list of any other user to whom the activity has been posted. After an activity has executed, its exit condition is evaluated. If not met, the activity is rescheduled for execution, otherwise all outgoing control connectors and the associated transition conditions are evaluated. A control connector is selected, if the condition evaluates to TRUE. The target activities of the selected control connectors are then evaluated. If their start conditions are true, they are posted to the work list of selected people.

A process is considered terminated, if all end activities have completed. To make sure that all end activities finish, a death path analysis is performed. This analysis removes all edges in the process graph which can never be reached due to failing transition conditions. All information about the current state of a process is stored in the database maintained by the server. This allows for forward recovery in the case of crashes.

Registered Programs within a WFMS

For an overview on the type of information available to a WFMS on registered process models and the programs implementing the activities within the process model tree dimensions of information have to be pointed out: the process logic dimension, the organizational structure, and the infrastructure, i.e. configuration, of the computer systems interconnected by computer networks.

Figure 1:
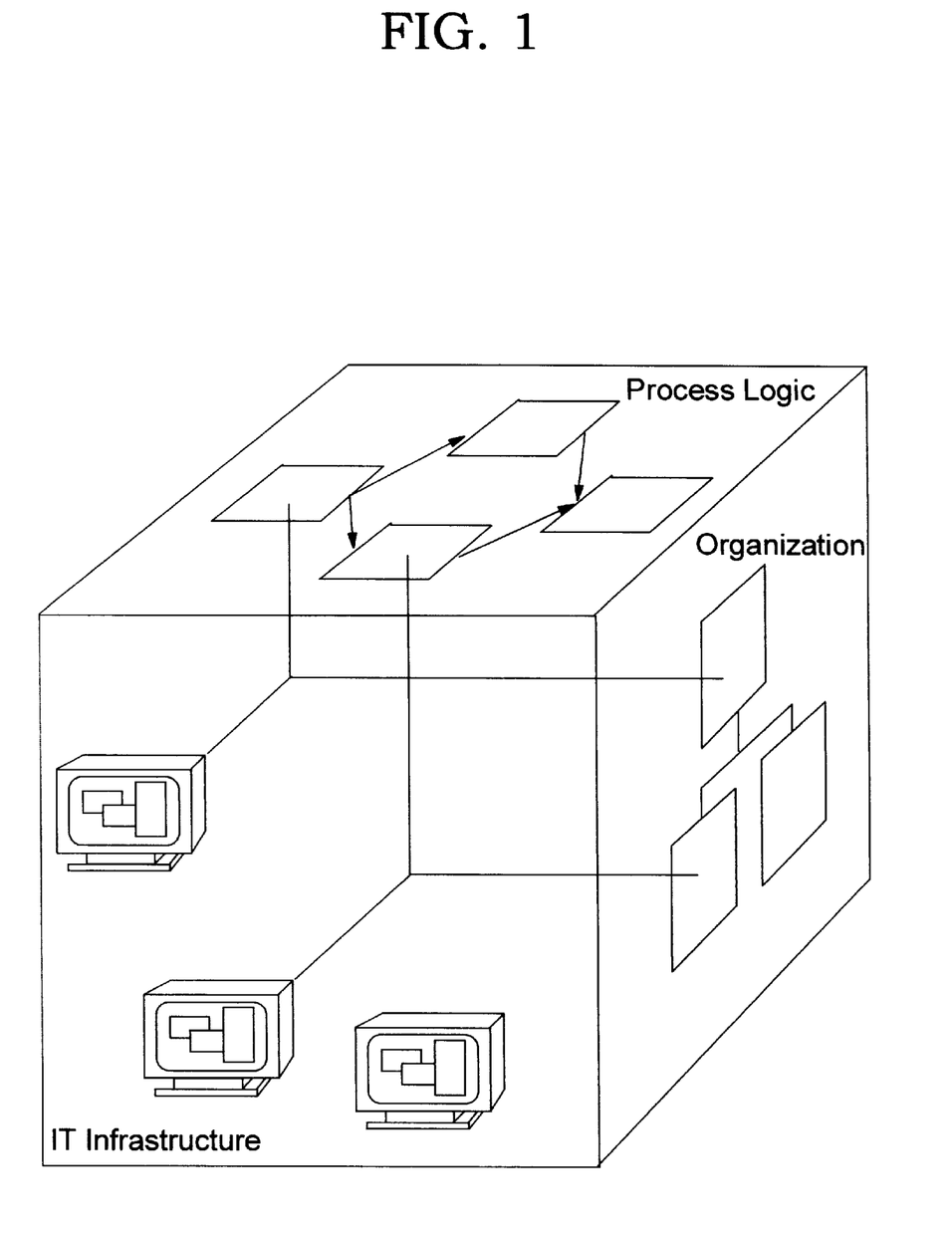
FIG. 1 is a diagram reflecting the dimensions of information available to a WFMS.

The first dimension, the process logic dimension describes the actions to be performed, by whom they have to be performed, with which program they have to be performed, and in which sequence they have to be performed. The second dimension, the organizational structure, describes the structure, the people, the roles the people are playing, and the computer server assigned to the people. The third dimension describes the infrastructure of the information technology devices, such as the WFMS servers, and the workstations/programs used by the users. These dimensions are illustrated in FIG. 1.

Referring to these dimensions, the actual execution of a workflow or process model is the execution of a series of points of the process model graph in the three-dimensional workflow space. Each point represents the execution of an activity by one person at one computer using a particular program. In other words, such applications are executed on different workstations with the proper program running on the workstation within its particular hardware and software environment.

Figure 2:
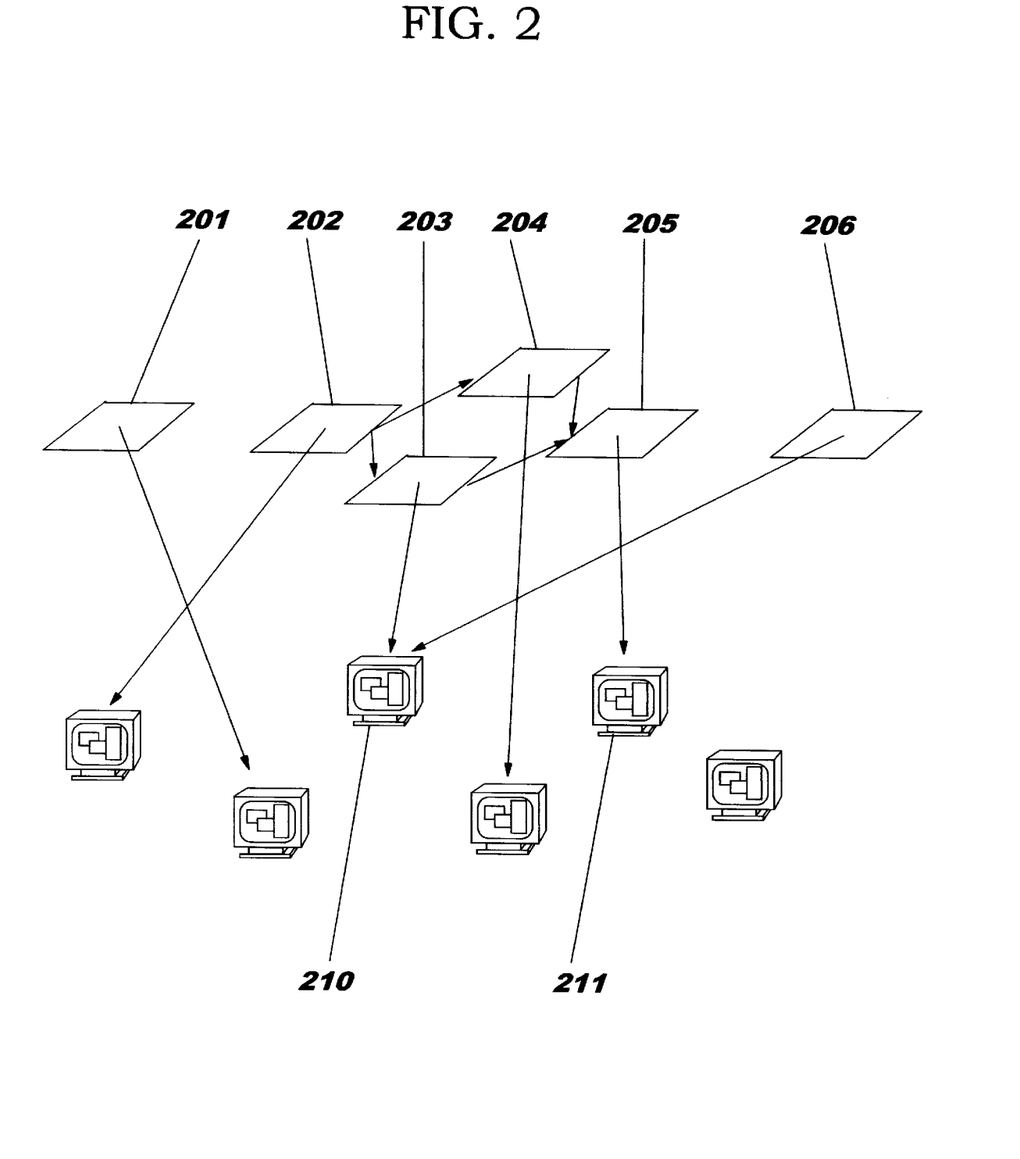
FIG. 2 is a visualization of a simple process model executing the registered programs for the individual activities in various computer systems within the IT infrastructure.

FIG. 2 illustrates this execution of a workflow or process model. The upper part of FIG. 2 shows a simple process model consisting of activities 201 through 206. As an example from within this process model, the registered programs executing activity 203 and 206 are executed on the computer system 210, while the registered program implementing activity 205 is executed by computer system 211. This processing behavior requires that the appropriate programs are available for execution on the user's work station and that the user's workstation is appropriately equipped with respect to hardware and software to support execution of the programs. As described below in further detail, information regarding the target system may be automatically deduced from the WFMS' process model information or other information sources within a data processing system. This information may include the precise processor models, the nature of the communication adapter which allows to communication with other computer systems across a computer network, other hardware equipment, the precise type of operating system controlling the target computer system's processors including the precise version and release of that operating system if multiple versions/release do exist, the precise type (including version and release) of communications software, and other types of information on software that builds the software environment on that target computer system which might be of importance for the execution of activity implementations.

Deriving Software Requirements from Process Models of WFMS

Figure 3:
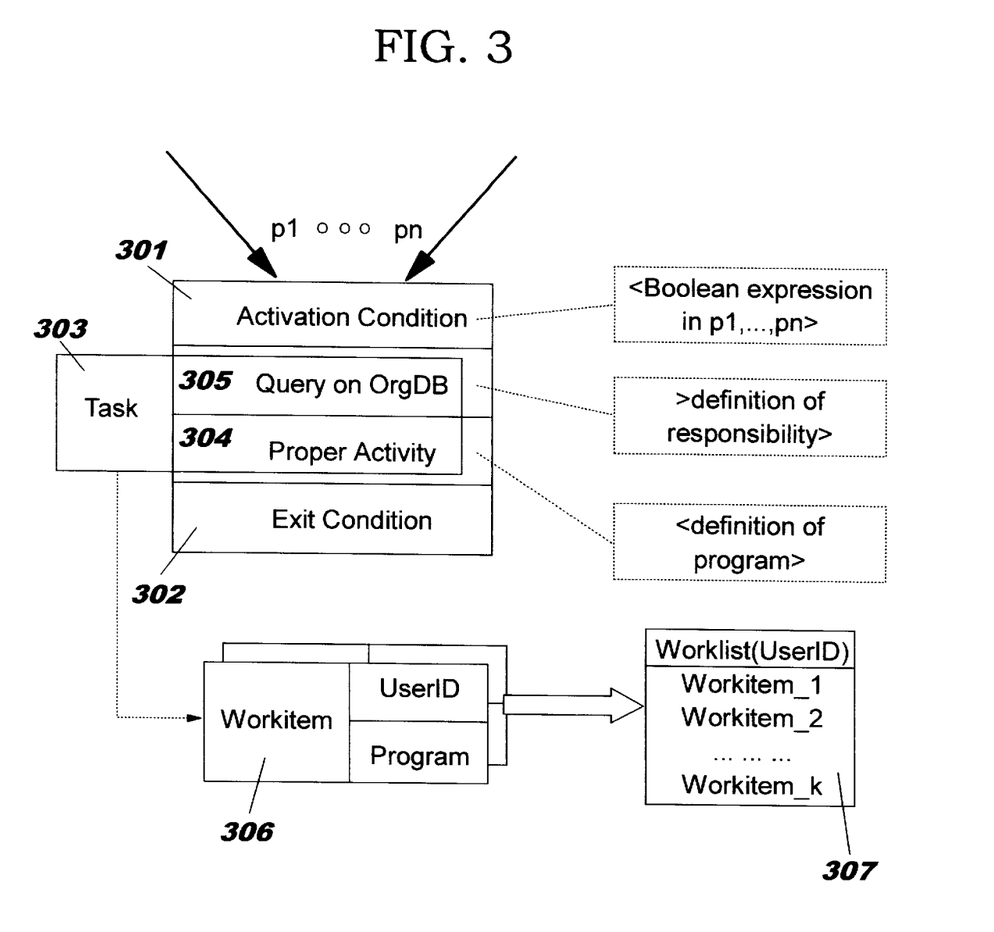
FIG. 3 is a visualization of the fine structure of the description of an activity within a process model of a WFMS.

Within a process model the activities to be performed typically have the fine structure defined as shown in FIG. 3. As seen in FIG. 3, the Activation Condition 301 is one part of an activity defines when the activity is ready for scheduling by the workflow manager. The description of the Activation Condition 301 encompasses a set of Boolean expressions which have to be true at runtime for the workflow manager to allow an activity to be started.

The Exit Condition 302 is another part of an activity and defines when an activity should be treated as complete by the workflow manager. Again, the description of the Exit Condition 302 encompasses a set of Boolean expressions which have to be true at runtime for the workflow manager to treat an activity as completed.

As is further illustrated in FIG. 3, the core of the description of an activity is the Task 303 which is comprised of the Proper Activity 304 and a Query on Organization DB 305. The Proper Activity 304 associates the activity with a program object. The program object is actually a program description that precisely defines for each type of operating system, and possibly for each user, the name and operational characteristics for an executable piece of software implementing that particular activity. The executable piece of software is started when the activity is performed by a user. Such a program description might include for each operating system type (potentially including version and release level) and for each type of processor of a target computer system the following:

a program identification precisely defining the program implementing the activity potentially including version and release level;

further co-requisite and pre-requisites of other software or hardware required to run that particular program; and user identifications of those users making use of that particular program.

These program descriptions are stored in the Program Repository, which may be an individual database or part of a larger database.

The Query on Organization DB 305 defines the persons, i.e. users, responsible for performing an activity. The Organization database might be a separate database or part of a larger database. When the activity is ready to be scheduled, the workflow management executes the specified query against the organization database. This query returns a set of persons, to which the activity is assigned. The task is transformed into a set of workitems 306 with one for each person selected as a result of the query against the organization database. The workitem 306 contains the name of the person and the program to be executed. These work items are made part of each the users' worklists 307.

A further source of information for the current invention is the Asset Database. The Asset Database, which also may be a separate DB or which might be part of some larger DB, stores precise information on the individual target computer systems. For each target computer systems the Asset Database may include information such as an identification of the target computer system, the hardware characteristics, especially the precise types of the processors, the size of main memory, the precise operating system type, potentially including version and release level, controlling the target computer system, precise information on the software environment on that system, potentially including version and release level, and a user identification of a user utilizing that system.

A further element of the current invention is the exploitation of Software Distribution Management System (SDMS). These systems support and ease the distribution and installation of software products on computer systems within distributed networks of heterogeneous computers. SDMS allows a source computer system to request a certain software package for a target computer system and the SDMS delivers and installs the requested software on the target computer system.

The present invention automatically distributes software to a target computer systems utilizing the elements described above. In its most basic form, the present invention is processed as one activity of one process model within the WFMS for distributing software to a target computer system. This processing includes a determination of software requirements for the target computer system. The description of the target computer system available through the Asset Database is analyzed. Also, the program description of the current activity of the current process model available through the Program Repository is analyzed. The result of this analysis is the determination of the program identification of that program (being an implementation of the current activity) which is executable within the current target computer system's hardware and software environment. This determination process might include ontaining the processor type and operating system type of the target computer system and using this information to select the program identification of the program executable on this processor type controlled by this operating system type. The program related to this program identification is one software requirement to be distributed and to be installed to the target computer system.

Software distribution may be carried out by using the determined program identification to request the associated program from the SDMS for distribution and/or installation. Optionally the SDMS performs an analysis of the requested software. For instance the SDMS might, based on configuration information relating to the target computer system, execute a pre- and co-requisite analysis to identify additional software required on the target computer system to process the requested software. In such a case this additional software will also be distributed to the target computer system.

In a further implementation of the current teaching above method could be extended to be repeated on a set of activities of the current process model. Each determined program identification is added to a list and once all activities have been processed the list of software requirements is used to request the corresponding programs from the SDMS for distribution to the target computer system.

Furthermore, all process models within the WFMS may be processed, resulting in the distribution of all programs of all activities by the SDMS to the target computer system.

Finally, not only may the programs implementing a WFMS activity be determined but also the identification of the WFMS itself may be determined in the process of software requirement determination. Such an approach allows the distribution of the WFMS itself to the target computer system. Further parts of the software environments on the target computer system including the operating system, the communication system and so forth may also be determined when the software requirement determination is made and requested from the SDMS with the software distribution request.

Figure 4:
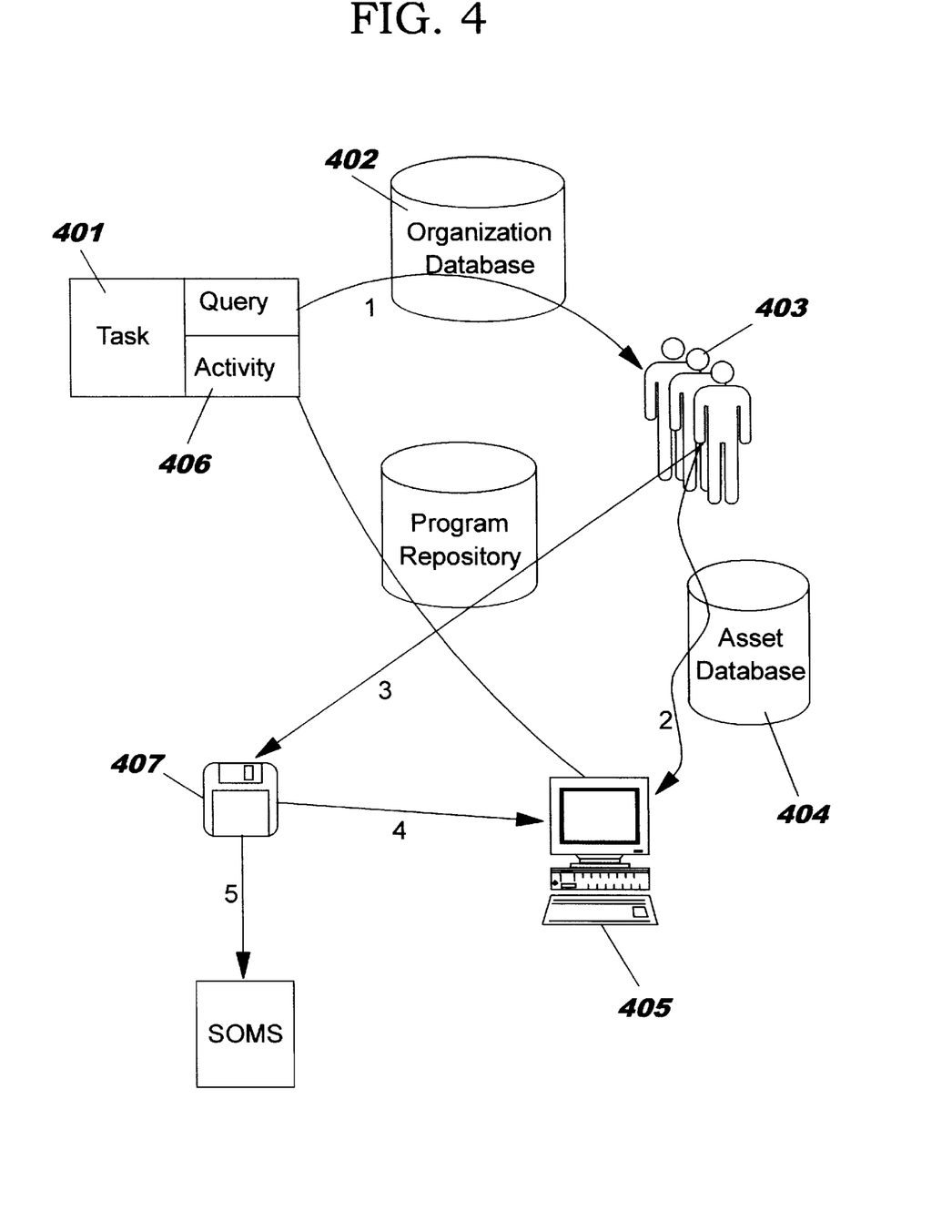
FIG. 4 depicts the method of the current teaching in an exhaustive manner.

In a more detailed and graphical manner, FIG. 4 shows the general process of how the information managed by the workflow management system is transformed into the software requirements for the work stations. In FIG. 4 the present invention provides for distributing for a set of users the software to all target computer systems of those users.

Based on the task description 401 of the current process model, the first operation performed (1) is a query against the organizational database 402 to obtain the set of users 403 to whom the activity may be assigned as a workitem. The substitutes which are handling the work items if the selected user is absent are included in the result set as well. Also included are all those users to whom the work item could be transferred.

Based on the set of determined users the next operation (2) is to determine the workstation, i.e. all target computer systems, 405 including the operating system types controlling those workstations used by the selected users. This determination process analyzes the Asset Database 404.

Next, (3) it is determined for each user 403, for each activity 406, and each operating system of each target computer system 405 the appropriate program object, i.e. program identifier.

Then, the selected program object is assigned to the appropriate workstation (4). The software requirements derived for one particular activity are combined with the software requirements of all other activities for all processes to be executed by one of the target workstations, thus assembling for each target computer a list of software requirements 407. This results in the total software requirements for a workstation.

Finally, a request comprising the total software requirements is sent to a commercial SDMS to deploy the correct software to the involved workstations (5). Optionally, the SDMS performs a further analysis on the requested software. For instance the SDMS might, based on configuration information relating to the target computer system and accessible to the SDMS, execute a pre- and co-requisite analysis to identify additional software required on the target computer system to process the requested software. In such a case, any additional software will also be distributed to the target computer system.

The same operations can also be applied if the activity to be analyzed according to the current teaching represents a sub-process in the sense of a WFMS, comprising a further sub-graph of activities.

Details on the Layout of the Various Databases

The example following below illustrates the utilization of the present invention for a single activity within a process model. Specifically, the example depicts a certain embodiment of the various databases and their layouts mentioned above. It should be pointed out, however, that the teaching of the current invention can also be applied to situations where the information the invention is dealing with is stored, not in a multitude of databases, but in a single common database. Moreover, instead of databases, flat files can be used without deviating from the current teaching.

Figure 5:
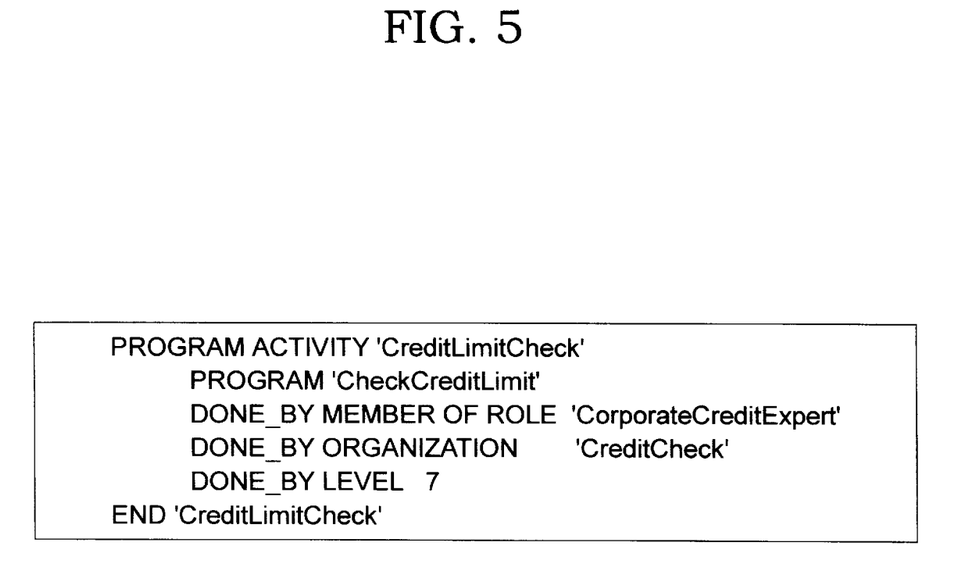
FIG. 5 is a visualization of the example activity definition within a process model.

The present example is concerned with checking the credit limit by a credit check department within a credit process. FIG. 5 shows the definition of the activity CreditLimitCheck. The activity is to be performed by a CorporateCreditExpert in department CreditCheck, who has a level of Senior, which is encoded as level 7. The activity is performed via the program CheckCreditLimit.

Figure 6:
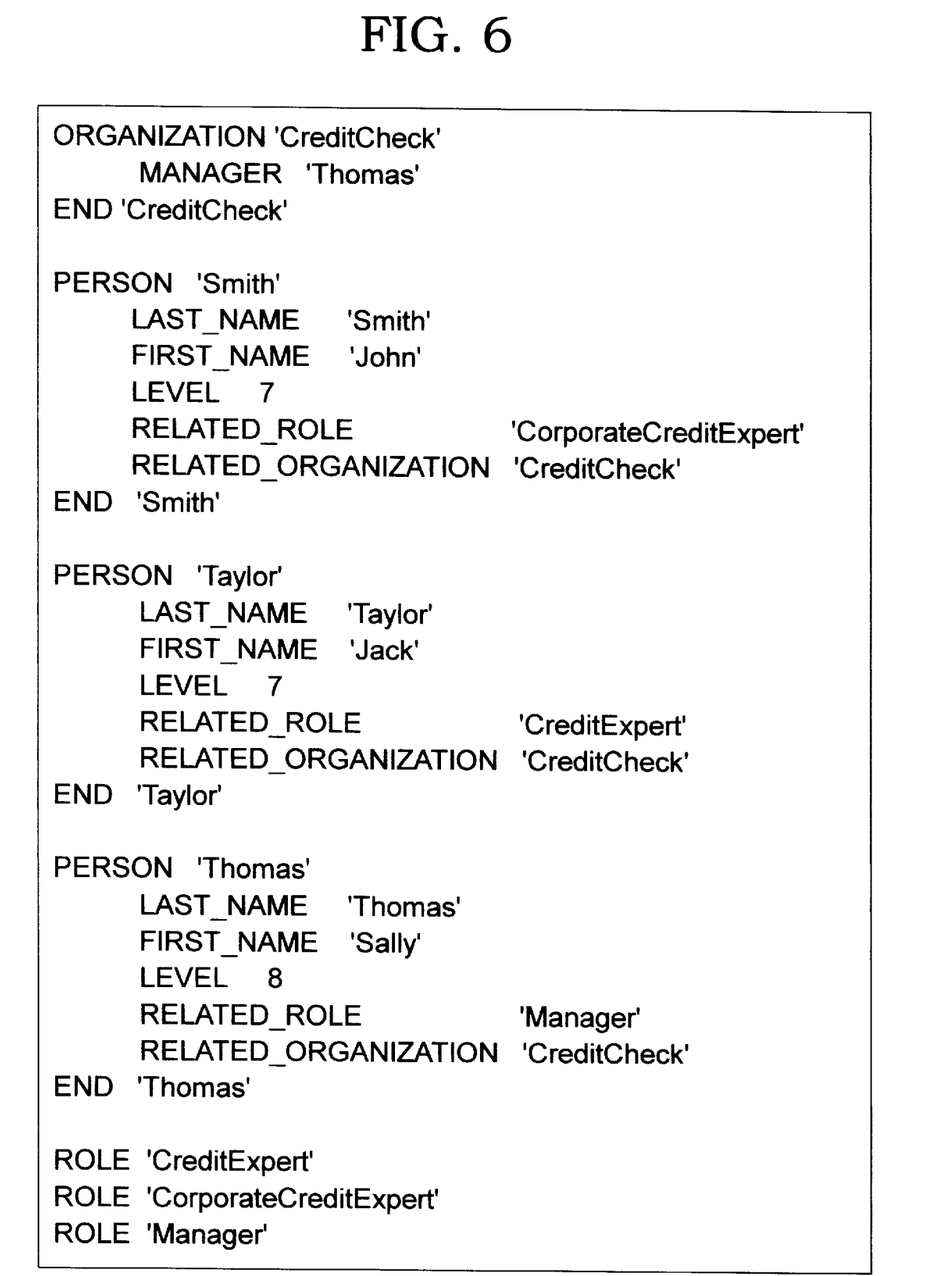
FIG. 6 is a visualization of an extract of the example's Staff or Organization Database.

As illustrated by the first operation of FIG. 4, a staff resolution operation is performed against the organization database. In the current example, this is assumed to be the staff database of the workflow management system. It could, however, also be a user managed database, in which case the user has to supply the appropriate staff resolution routine. FIG. 6 shows a part of the staff database. It contains the department CheckCredit, which includes three persons (Smith, Taylor, and Thomas) and three roles (CreditExpert, CorporateCreditExpert, Manager). Therefore, the staff resolution operation returns the person Smith, as the only one in the department with a level of 7 and the role of CorporateCreditExpert.

Figure 7:
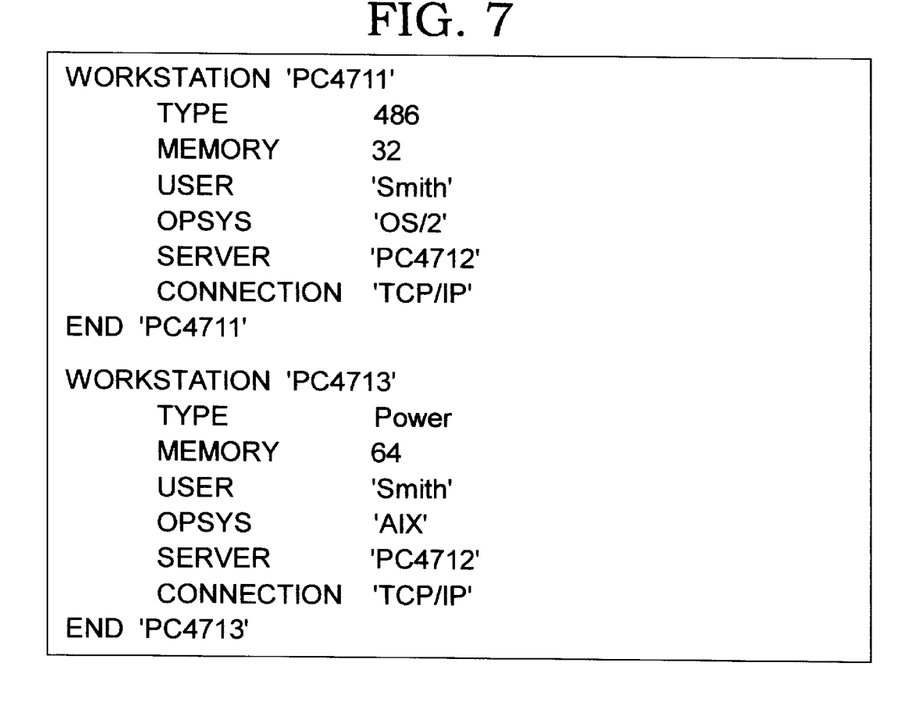
FIG. 7 is a visualization of an extract of the example's Asset Database.

After the qualifying persons have been found, the second operation (2) of FIG. 4 is carried out. The Asset Database is accessed to determine the workstations, i.e. the target computer systems of the selected persons. This includes determining the particular operating system on the workstation, potentially including version and release level information which is omitted for simplicity in the current example. FIG. 7, which illustrates an extract of an Asset Database, shows the definition of Smith's workstations. As seen in FIG. 7, Smith uses two work stations including, a PC4711 running OS/2 and a PC4713 running AIX as their operating systems.

Figure 8:
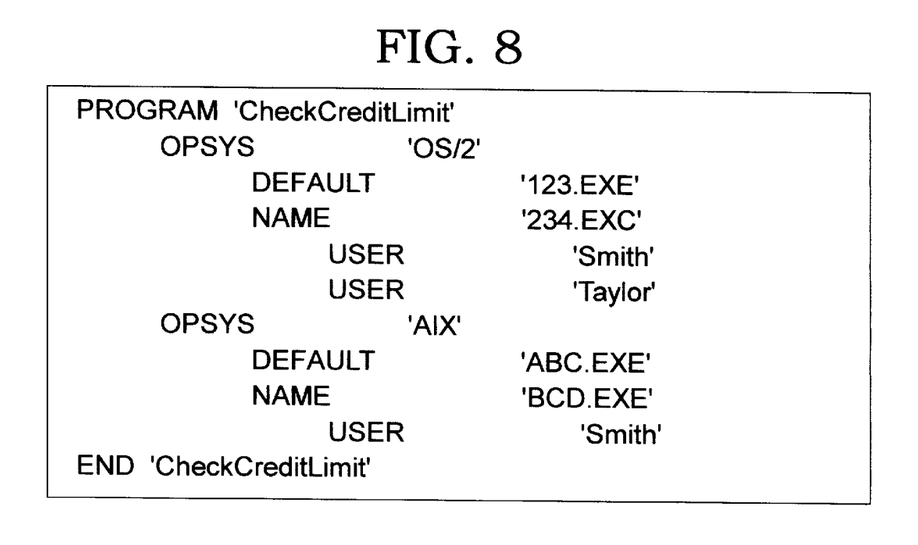
FIG. 8 is a visualization of an extract of the example's Program Repository.

The third operation (3) of FIG. 4 now determines the name of the program to be placed on the user's workstation (s). In general, the complete program identification is determined which might include version and release level information. FIG. 8 shows the definition of the program CheckCreditLimit as an extract of the Program Repository. The default program used under OS/2 is 123.EXE, under AIX ABC.EXE. Users Smith and Taylor, however, use program 234.EXE under OS/2 and user Smith uses BCD.EXE under AIX. This information may be provided to a SDMS and then utilized to provide the necessary software to the appropriate work stations.

Further Aspects

The present invention is capable of cooperating with a typical SDMS. One candidate for instance is a SDMS of Tivoli Systems, Inc. which provides a SDMS as a set of tools to manage and administer the distribution of software. These tools are based on the technology called management by subscription. It allows for the registration of subscriptions to programs and/or a set of programs for a target computer system. The information generated by the operations according the present invention which describe a workstation needs can be used to generate the appropriate subscriptions. This technology is the basis of the teaching of N. R. Prager et al., Distributed Network Configuration Management Using a Subscription Method, U.S. Pat. application filed Dec. 13, 1993, the disclosure of which is incorporated by reference herein as if set forth fully.

The present invention is applicable to a wide range of scenarios including distribution of a complete software package for an initial installation of software. Moreover the present invention is applicable also to the situation of an incremental installation relating to an installation request of one or a few programs only.

One type of incremental installation request is targeted at a situation in which a new process model is added to a WFMS. Under such conditions the present invention could be utilized to distribute all programs of all activities of the new process model to all target computer systems defined as a system potentially responsible for executing the software.

Another type of incremental installation for which the present invention may be useful is a situation in which an already existing process model has been modified. For example, modifications to a process model may be needed when adding new activities or changing the program for a specific implementation of a certain activity. Under such conditions the present invention could be applied to distribute all new or modified programs of all new or modified activities of the process model to all target computer systems defined as a system potentially responsible for executing the software.

A further type of incremental installation involves the situation in which a new user and/or a new target computer system has been defined as being responsible to process certain activities of already existing process models. Under such conditions the present invention could be used to distribute all necessary programs of all activities of the process model to the new user's target computer systems.

In a different approach the present invention may also be applied to distribute software which actually is not participating in a WFMS environment in the sense that the execution of the programs is controlled by the WFMS. Thus, if such programs are to be distributed to a target computer system it is sufficient to define these programs as the implementation of some "virtual" process model. Such a process model is called a virtual because the idea behind this approach is that the process model is never going to be executed by the WFMS. The process model serves only to define the programs of a software package to be distributed using the current invention. Consequently, the precise graph of such a virtual process model may be arbitrarily chosen. Once the virtual process has been defined the present invention may be applied to it for distributing the corresponding software to any target computer system.

Implementation of the present invention imposes no limitation on whether the method is implemented with the WFMS itself or whether implementation of the method is part of an application external to the WFMS.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of automatically distributing software to a target computer system, the method comprising the steps of:

obtaining a computer-system-description of the target-computer-system;

obtaining at least one process-model of a workflow-management-system (WFMS) which includes an activity to be carried out by the target computer system; and determining the software requirements of the target computer system based upon the process model of the WFMS and the computer-system-description of the target computer system; and providing the determined software requirements to a software distribution management system (SDMS) to distribute the determined software to the target computer system.

2. A method according to claim 1, wherein at least one activity is associated with at least one program-description of a program implementing the activity which includes at least one program-identification, and wherein said determining step comprises the step of analyzing the computer-system-description of the target-computer-system and the program-description of the at least one activity of the process-model of the WFMS to determine a program-identification of a program which is executable on the target computer system; and wherein the determined program-identification is used by said providing step to request the determined program from the SDMS.

3. A method according to claim 1, further comprising the step of defining at least one process-model within a workflow management system (WFMS), wherein the process model includes at least one activity connected as an arbitrary graph.

4. A method according to claim 1, further comprising the step of providing the determined software to the target computer system through the SDMS.

5. A method according to claim 1, further comprising:

determining from the determined software requirements associated with the at least one activity, whether the target computer system has any prerequisite software requirements; and providing the prerequisite software to the target computer system through the SDMS.

6. A method according to claim 1, wherein the process model includes a plurality of activities and where said determining step and said providing step are carried out for each of the activities of the process model.

7. A method according to claim 1, where the activities are associated with a plurality of target computer systems and wherein said step of obtaining a computer-system-description of the target computer system comprises the step of obtaining a computer-system-description for each of the target computer systems; and wherein said step of determining the software requirements of the target computer system comprises the step of determining the software requirements for each of the plurality of target computer systems based upon the process model of the WFMS and the computer-system-description of the target computer system; and wherein said step of providing the determined software requirements to a software distribution management system (SDMS) comprises the step of providing the determined software requirements for each of the plurality of target computer systems to distribute the determined software to the target computer systems.

8. A method according to claim 7, wherein each of the plurality of computer-system-descriptions includes a user identification of a user of the corresponding target computer system and wherein the activity is associated with a user description identifying a user identification of at least one authorized user to execute the activity, the method further comprising the step of:

identifying at least one target computer system from the plurality of target computer systems based on the activity such that the at least one identified target system corresponds to a user identification of a user authorized to execute the activity; and wherein said determining and said providing steps are carried out for the at least one identified target computer system.

9. A method according to claim 1, wherein said step of determining the software requirements further comprises the step of adding the determined software requirements to a list of software requirements; and wherein said step of requesting includes the step of providing the list of software requirements to the SDMS.

10. A method according to claim 1, further comprising the steps of:

analyzing the computer-system-description of the target computer system to determine if the WFMS is to be executed on the target computer system; and including the WFMS in the determined software requirements if it is determined that the WFMS is to be executed on the target system.

11. A system of automatically distributing software to a target computer system, comprising:

means for obtaining a computer-system-description of the target-computer-system;

means for obtaining at least one process-model of a workflow-management-system (WFMS) which includes an activity to be carried out by the target computer system; and means for determining the software requirements of the target computer system based upon the process model of the WFMS and the computer-system-description of the target computer system; and means for providing the determined software requirements to a software distribution management system (SDMS) to distribute the determined software to the target computer system.

12. A system according to claim 11, wherein the at least one activity is associated with at least one program-description of a program implementing the activity which includes at least one program-identification, and wherein said means for determining comprises means for analyzing the computer-system-description of the target-computer-system and the program-description of the at least one activity of the process-model of the WFMS to determine a program-identification of a program which is executable on the target computer system; and wherein the determined program-identification is used by said means for providing to request the determined program from the SDMS.

13. A system according to claim 11, further comprising means for defining at least one process-model within a workflow management system (WFMS), wherein the process model includes at least one activity connected as an arbitrary graph.

14. A system according to claim 11, further comprising means for providing the determined software to the target computer system through the SDMS.

15. A system according to claim 11, further comprising:

means for determining from the determined software requirements associated with the at least one activity, whether the target computer system has any prerequisite software requirements; and means for providing the prerequisite software to the target computer system through the SDMS.

16. A system according to claim 11, wherein the process model includes a plurality of activities and where said means for determining and said means for providing steps are carried out for each of the activities of the process model.

17. A system according to claim 11, wherein the activities are associated with a plurality of target computer systems and wherein said means for obtaining a computer-system-description of the target computer system comprises means for obtaining a computer-system-description for each of the target computer systems;

wherein said means for determining the software requirements of the target computer system comprises means for determining the software requirements for each of the plurality of target computer systems based upon the process model of the WFMS and the computer-system-description of the target computer system; and wherein said means for providing the determined software requirements to a software distribution management system (SDMS) comprises the means for providing the determined software requirements for each of the plurality of target computer systems to distribute the determined software to the target computer systems.

18. A system according to claim 17, wherein each of the plurality of computer-system-descriptions includes a user identification of a user of the corresponding target computer system and wherein the activity is associated with a user description identifying a user identification of at least one authorized user to execute the activity, further comprising:

means for identifying at least one target computer system from the plurality of target computer systems based on the activity such that the at least one identified target system corresponds to a user identification of a user authorized to execute the activity; and wherein said means for determining and said means for providing utilize the at least one identified target computer system.

19. A system according to claim 11, wherein said means for determining the software requirements further comprises means for adding the determined software requirements to a list of software requirements; and
　　wherein said means for requesting includes means for providing the list of software requirements to the SDMS.

20. A system according to claim 11, further comprising:
　　means for analyzing the computer-system-description of the target computer system to determine if the WFMS is to be executed on the target computer system; and
　　means for including the WFMS in the determined software requirements if it is determined that the WFMS is to be executed on the target system.

21. A computer program product for automatically distributing software to a target computer system, comprising:
　　a computer-readable storage medium having computer-readable program code means embodied in said medium, said computer-readable program code means comprising:
　　　　computer-readable program code means for obtaining a computer-system-description of the target-computer-system;
　　　　computer-readable program code means for obtaining at least one process-model of a workflow-management-system (WFMS) which includes an activity to be carried out by the target computer system; and
　　　　computer-readable program code means for determining the software requirements of the target computer system based upon the process model of the WFMS and the computer-system-description of the target computer system; and
　　computer-readable program code means for providing the determined software requirements to a software distribution management system (SDMS) to distribute the determined software to the target computer system.

22. A computer program product according to claim 21, wherein the at least one activity is associated with at least one program-description of a program implementing the activity which includes at least one program-identification, and wherein said computer-readable program code means for determining comprises computer-readable program code means for analyzing the computer-system-description of the target-computer-system and the program-description of the at least one activity of the process-model of the WFMS to determine a program-identification of a program which is executable on the target computer system; and
　　wherein the determined program-identification is used by said computer-readable program code means for providing to request the determined program from the SDMS.

23. A computer program product according to claim 21, further comprising computer-readable program code means for defining at least one process-model within a workflow management system (WFMS), wherein the process model includes at least one activity connected as an arbitrary graph.

24. A computer program product according to claim 21, further comprising computer-readable program code means for providing the determined software to the target computer system through the SDMS.

25. A computer program product according to claim 21, further comprising:
　　computer-readable program code means for determining from the determined software requirements associated with the at least one activity, whether the target computer system has any prerequisite software requirements; and
　　computer-readable program code means for providing the prerequisite software to the target computer system through the SDMS.

26. A computer program product according to claim 21, wherein the process model includes a plurality of activities and where said computer-readable program code means for determining and said computer-readable program code means for providing steps are carried out for each of the activities of the process model.

27. A computer program product according to claim 21, wherein the activities are associated with a plurality of target computer systems and wherein said computer-readable program code means for obtaining a computer-system-description of the target computer system comprises computer-readable program code means for obtaining a computer-system-description for each of the target computer systems;
　　wherein said computer-readable program code means for determining the software requirements of the target computer system comprises computer-readable program code means for determining the software requirements for each of the plurality of target computer systems based upon the process model of the WFMS and the computer-system-description of the target computer system; and
　　wherein said computer-readable program code means for providing the determined software requirements to a software distribution management system (SDMS) comprises the computer-readable program code means for providing the determined software requirements for each of the plurality of target computer systems to distribute the determined software to the target computer systems.

28. A computer program product according to claim 27, wherein each of the plurality of computer-system-descriptions includes a user identification of a user of the corresponding target computer system and wherein the activity is associated with a user description identifying a user identification of at least one authorized user to execute the activity, further comprising:
　　computer-readable program code means for identifying at least one target computer system from the plurality of target computer systems based on the activity such that the at least one identified target system corresponds to a user identification of a user authorized to execute the activity; and
　　wherein said computer-readable program code means for determining and said computer-readable program code means for providing utilize the at least one identified target computer system.

29. A computer program product according to claim 21, wherein said computer-readable program code means for determining the software requirements further comprises computer-readable program code means for adding the determined software requirements to a list of software requirements; and
　　wherein said computer-readable program code means for requesting includes computer-readable program code means for providing the list of software requirements to the SDMS.

30. A computer program product according to claim 21, further comprising:
　　computer-readable program code means for analyzing the computer-system-description of the target computer system to determine if the WFMS is to be executed on the target computer system; and
　　computer-readable program code means for including the WFMS in the determined software requirements if it is determined that the WFMS is to be executed on the target system.

* * * * *